United States Patent
Morgner

(10) Patent No.: US 9,722,792 B2
(45) Date of Patent: Aug. 1, 2017

(54) READING OF AN ATTRIBUTE FROM AN ID TOKEN

(71) Applicant: BUNDESDRUCKEREI GMBH, Berlin (DE)

(72) Inventor: Frank Morgner, Grünheide (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 15 days.

(21) Appl. No.: 14/770,546

(22) PCT Filed: Feb. 19, 2014

(86) PCT No.: PCT/EP2014/053249
§ 371 (c)(1),
(2) Date: Aug. 26, 2015

(87) PCT Pub. No.: WO2014/131675
PCT Pub. Date: Sep. 4, 2014

(65) Prior Publication Data
US 2016/0006566 A1    Jan. 7, 2016
US 2017/0005800 A9    Jan. 5, 2017

(30) Foreign Application Priority Data
Feb. 27, 2013    (DE) .......................... 10 2013 203 257

(51) Int. Cl.
H04L 29/00    (2006.01)
H04L 9/32     (2006.01)
(Continued)

(52) U.S. Cl.
CPC ............ *H04L 9/3221* (2013.01); *G06F 21/35* (2013.01); *G06F 21/43* (2013.01); *H04L 9/0841* (2013.01);
(Continued)

(58) Field of Classification Search
CPC ................................. H04L 9/03; G06F 21/03
See application file for complete search history.

(56) References Cited

U.S. PATENT DOCUMENTS 5,241,599 A    8/1993    Bellovin et al.
6,792,533 B2   9/2004    Jablon
(Continued)

FOREIGN PATENT DOCUMENTS

DE    10 2008 040416    1/2010
WO    WO 2010/048350    4/2010

OTHER PUBLICATIONS

Alpár G., Batina L., Verdult R. (2012) Using NFC Phones for Proving Credentials. In: Schmitt J.B. (eds) Measurement, Modelling, and Evaluation of Computing Systems and Dependability and Fault Tolerance. MMB&DFT 2012. Lecture Notes in Computer Science, vol. 7201. Springer, Berlin, Heidelberg.*

(Continued)

*Primary Examiner* — Madhuri Herzog
(74) *Attorney, Agent, or Firm* — Leveque IP Law, P.C.

(57) ABSTRACT

The disclosure relates to a method for reading at least one attribute stored in an ID token, wherein the ID token is assigned to a user, said method comprising: determining, by a terminal, of whether a contact-based interface of the ID token is present and can be used for data exchange with the terminal. If the ID token does not have the contact-based interface or this cannot be used, implementing a zero-knowledge authentication protocol via a contactless interface of the terminal and ID token;
and deriving an ID token identifier by the terminal. If the ID token has the contact-based interface and this can be used, authenticating the user to the ID token via the contact-based interface; accessing to an ID token identifier by the terminal; sending of the ID token identifier from the terminal to an ID provider computer; use of the ID token identifier by the ID (Continued)

Figure 3:
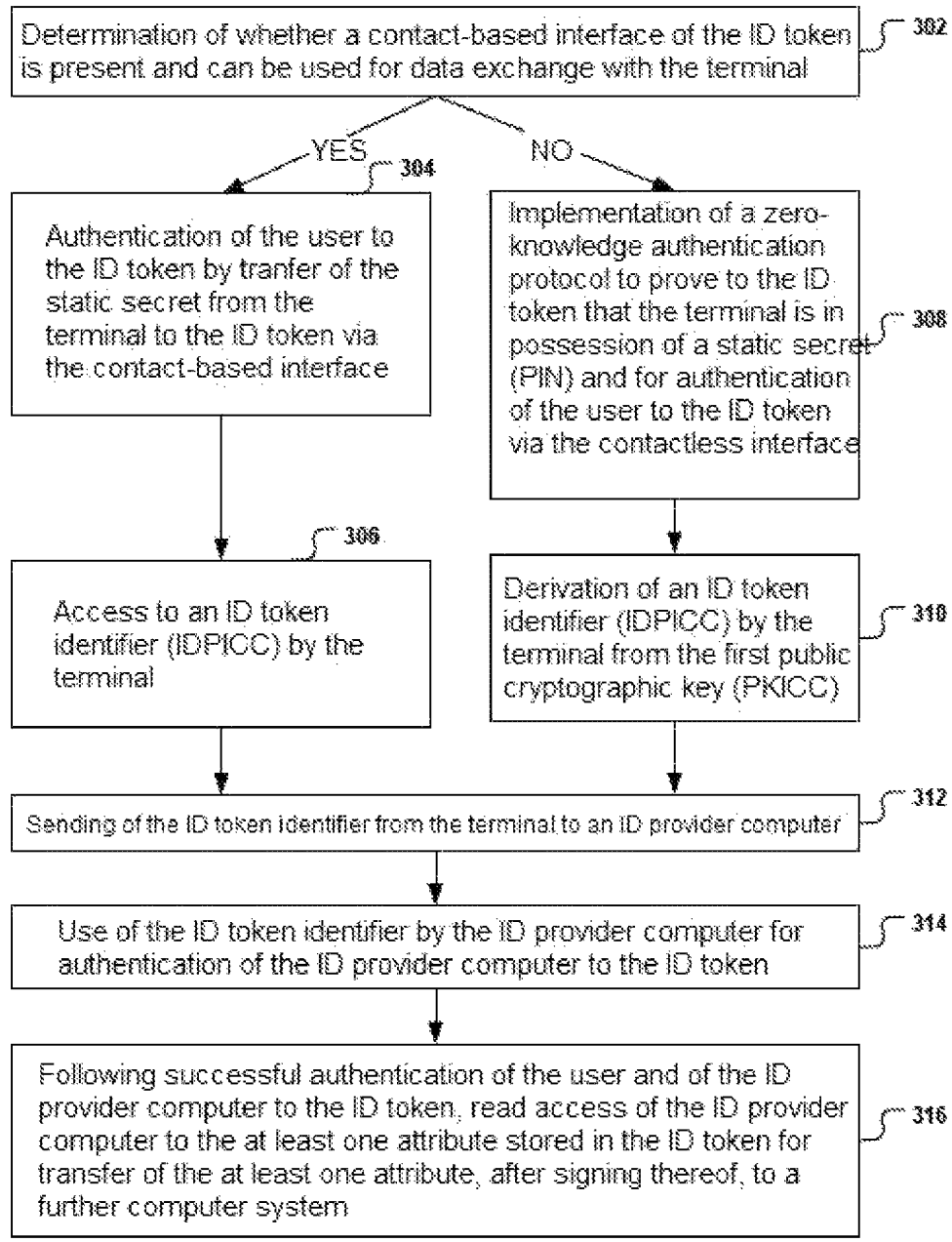

provider computer in order to authenticate the ID provider computer to the ID token; and read access of the ID provider computer to the at least one attribute stored in the ID token.

14 Claims, 4 Drawing Sheets

(51) Int. Cl.
| | |
|---|---|
| *G06F 21/43* | (2013.01) |
| *H04W 12/06* | (2009.01) |
| *H04L 9/08* | (2006.01) |
| *H04L 9/30* | (2006.01) |
| *G06F 21/35* | (2013.01) |
| *H04L 29/06* | (2006.01) |

(52) U.S. Cl.
CPC .......... *H04L 9/0866* (2013.01); *H04L 9/3066* (2013.01); *H04L 9/3234* (2013.01); *H04L 63/205* (2013.01); *H04W 12/06* (2013.01); *H04L 63/0492* (2013.01)

(56) References Cited

U.S. PATENT DOCUMENTS

| | | |
|---|---|---|
| 7,139,917 B2 | 11/2006 | Jablon |
| 7,597,250 B2 * | 10/2009 | Finn ...................... B60R 25/25 235/375 |
| 2009/0289117 A1 * | 11/2009 | Lu ...................... G06K 7/0004 235/440 |

OTHER PUBLICATIONS

Weimerskirch, André, and Dirk Westhoff. "Zero common-knowledge authentication for pervasive networks." International Workshop on Selected Areas in Cryptography. Springer Berlin Heidelberg, 2003.*

EPO IPR, PCT/EP2014/053249, Jul. 14, 2014.

Lishoy et al., "A Security Framework Model with Communication Protocol Translator Interface for Enhancing NFC Transactions", AICT Conference, IEEE, May 9, 2010, pp. 452-461, ISBN 978-1-4244-6748-8.

Bander et al., "Security Analysis of the PACE Key-Agreement Protocol", ISC 2009, pp. 33-48, Jan. 1, 2009.

Federal Office for Information Security, "Advanced Security Mechanism for Machine Readable Travel Documents and eIDAS Token", Technical Guideline TR-03110-1, Version 2.20, Feb. 26, 2015.

Federal Office for Information Security, "Advanced Security Mechanism for Machine Readable Travel Documents and eIDAS Token", Technical Guideline TR-03110-2, Version 2.20, Feb. 3, 2015.

Federal Office for Information Security, "Advanced Security Mechanism for Machine Readable Travel Documents and eIDAS Token", Technical Guideline TR-03110-3, Version 2.20, Feb. 3, 2015.

Federal Office for Information Security, "Advanced Security Mechanism for Machine Readable Travel Documents and eIDAS Token", Technical Guideline TR-03110-4, Version 2.20, Feb. 3, 2015.

Jablon, D.P., "Strong Password-Only Authenticated Key Exchange", www.jablon.org/speke97.html , Mar. 2, 1997.

* cited by examiner

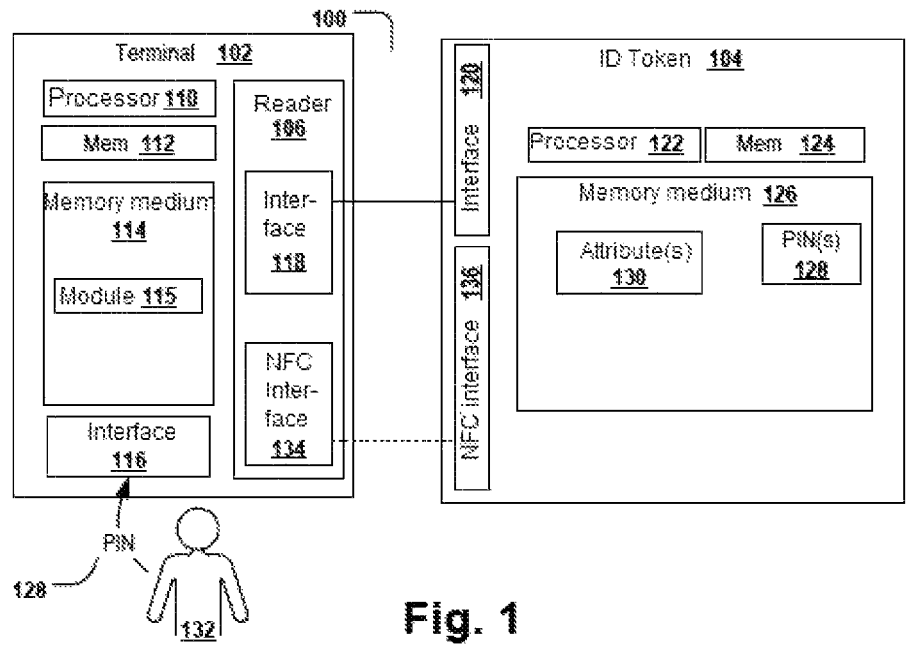
Fig. 1
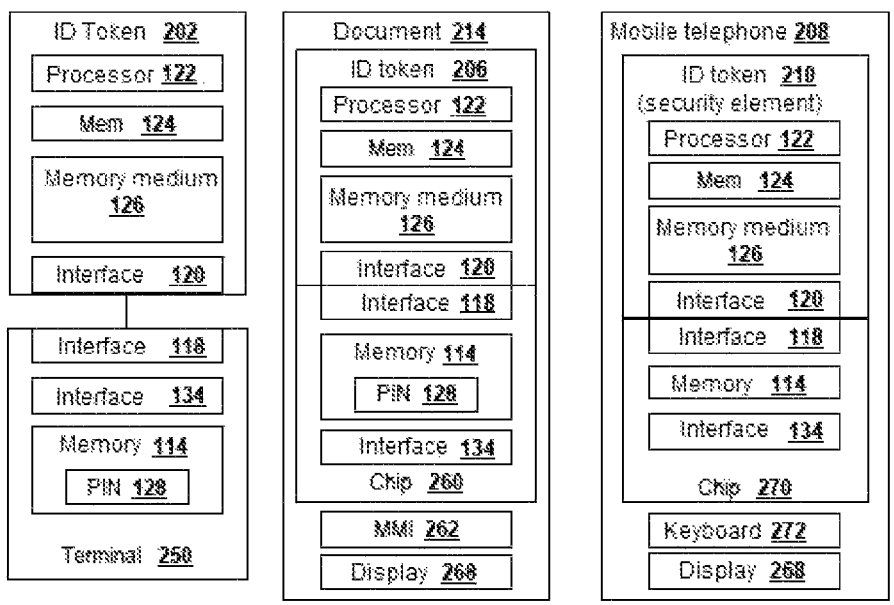
Fig. 2A  Fig. 2B  Fig. 2C

READING OF AN ATTRIBUTE FROM AN ID TOKEN

The invention relates to a method for reading at least one attribute from an ID token and also to a corresponding terminal and computer program product.

Various methods for the management of what is known as the digital identity of a user are known from the prior art:

Microsoft Windows CardSpace is a client-based digital identity system, which is intended to enable Internet users to communicate their digital identity with online services. A disadvantage here is that, inter alia, the user can manipulate his/her digital identity.

For terminal authentication or in order to establish a secure data transfer channel between an ID token and a computer system, various protocols such as PACE ("Password Authenticated Connection Establishment") or EAC ("Extended Access Control') are used. The protocols should ensure that the user has given his/her consent for the readout of attributes from the ID token by the computer system and that the document is also located physically in a certain region, for example the receiving region of the NFC interface of a card-reading terminal. A disadvantage of the protocols used currently is that they require high CPU usage and their running time is often too long for very time-critical applications. In particular, the implementation of cryptographic operations and one or more request-response cycles to establish the data transfer channel require time in order to compute keys and to exchange data.

By contrast, the object of the invention is to create an improved method for reading at least one attribute, and also a corresponding terminal and computer program product.

The objects forming the basis of the invention are each achieved by the features of the independent claims. Embodiments of the invention are specified in the dependent claims. Unless otherwise stated, embodiments of the invention can be freely combined with one another.

The ID token may be a portable electronic device, such as what is known as a USB stick, or a document, in particular a value or security document.

A "document" is understood in accordance with the invention to mean paper-based and/or plastic-based documents, such as identification documents, in particular passports, identity cards, visas and driver's licenses, vehicle licenses, vehicle registration documents, company IDs, health cards or other ID documents as well as chip cards, payment means, in particular bank cards and credit cards, waybills or other proofs of authorisation, in which a data memory for storing at least one attribute is integrated.

An "attribute" will be understood hereinafter to mean a data value, for example a number or text. The attribute may be constituted by information regarding the identity of a user assigned to the ID token, in particular regarding what is known as the digital identity thereof. By way of example, the surname, first name, and address of the user may constitute attributes. An attribute may also contain data used to check the eligibility of the user to use a certain online service, such as the age of the user when the user wishes to use an online service reserved for a certain age group, or a another attribute recording the affiliation of the user with a certain group authorised to use the online service.

An "ID provider computer" is to be understood to mean a data processing system of an entity providing authentication services. In particular, this entity may be a government authority and the authentication service may be the automatic confirmation of the digital identity of a user or the validity of personal attributes of the user. In accordance with one embodiment of the invention the ID provider computer is an officially certified trust centre, in particular a trust centre compliant with the German Signatures Act.

A "secure element (SE)" is a smart card chip which is tamper-proof and which provides a runtime environment for chip card applications (what are known as Applets or Cardlets). The chip may provide hardware-based functions, in particular in the form of cryptographic co-processor is for implementing security-based algorithms, such as DES, AES and RSA.

A "static" key or data value will be understood hereinafter to mean a cryptographic key or data value which is stored in a non-volatile memory medium and is used or can be used for more than just one session. By contrast, session keys or session-bound, temporary keys or data values are generated only for one session and are not permanently stored, such that they can no longer be used in a further session.

A "zero-knowledge authentication protocol" will be understood here to mean any method in which a secret to be checked does not have to be transferred from a first subscriber, for example a terminal, to a second subscriber, for example an ID token, for authentication of the first subscriber to the second subscriber, in order to compare the secret with a secret known to the second subscriber as a reference value, but in which the authentication is performed by means of a protocol involving both the first and the second subscriber. Corresponding protocols are known per se from the prior art, such as Strong Password Only Authentication Key Exchange (SPEKE), Diffie-Hellman Encrypted Key Exchange (DH-EKE), Bellovin-Merritt Protocol or Password Authenticated Connection Establishment (PACE). The SPEKE protocol is known for example from www-.jablon.org/speke97.html, U.S. Pat. No. 6,792,533 B2 and U.S. Pat. No. 7,139,917 B2. The DH-EKE protocol is likewise known inter alia from www.jablon.org/speke97.html. The Bellovin-Merritt protocol is known inter alia from U.S. Pat. No. 5,241,599. The PACE protocol is known from BSI TR-03110 and Bender, Fischlin and Kugler 2009 "Security Analysis of the PACE-Agreement Protocol" (Lecture Notes in Computer Science Volume 5735, pages 33-48) and is particularly suitable for elliptic curve cryptography.

In one aspect the invention relates to a method for reading at least one attribute stored in an ID token. The ID token is assigned to a user. The method comprises:

determination, by means of a terminal, of whether a contact-based interface of the ID token is present and can be used for data exchange with the terminal.

If the ID token does not have the contact-based interface or this cannot be used, the following steps are carried out:

implementation of a zero-knowledge authentication protocol via a contactless interface of the terminal and ID token in order to prove to the ID token that the terminal is in possession of a static secret, without transmitting this static secret to the ID token; the static secret is a secret shared between the user and the ID token, for example a PIN, which is stored securely in the ID token; the secret may also be a card number printed on a document containing the ID token, the number in an MRZ (machine readable zone) of the document, or something similar; the implementation comprises a generation of a first public cryptographic key by the ID token and the authentication of the user to the ID token via the contactless interface; and derivation of an ID token identifier by the terminal from the first public cryptographic key. The term "derivation", besides the derivation of an amended value with a derivation function, also comprises the use of the first public cryptographic key in unamended form as the ID token identifier.

If the ID token has the contact-based interface and this can be used, the user is authenticated to the ID token by transmission of the static secret, for example a PIN, a CAN or a biometric feature of the user, from the terminal to the ID token via the contact-based interface. In addition, an ID token identifier is also accessed by the terminal in this case.

The access comprises:
reading of a data value, which was already stored on the memory of the terminal prior to the determination, from the memory, wherein the data value is also stored on a memory of the ID token prior to the determination, and use of the data value as the ID token identifier by means of the terminal and by means of the ID token; or in response to the determination, generation of a data value by means of the terminal, transmission of the data value from the terminal to the ID token and use of the generated data value as the ID token identifier by means of the terminal and by means of the ID token; or generation of a data value by means of the ID token, transmission of the data value from the ID token to the terminal, and use of the generated data value as the ID token identifier by means of the terminal and by means of the ID token.

The method also comprises:
sending of the ID token identifier from the terminal to an ID provider computer;
use of the ID token identifier by means of the ID provider computer in order to authenticate the ID provider computer to the ID token;
following successful authentication of the user and the ID provider computer to the ID token, read access of the ID provider computer to the at least one attribute stored in the ID token in order to transfer the at least one attribute, after signing thereof, to a further computer.

The term "ID token identifier" designates a value which has the function of enabling the ID provider computer to authenticate itself to the ID token. An ID token identifier may be assigned to the ID token for example in that it is stored permanently therein or is generated thereby, wherein the ID token comprises a function, i.e. an ID provider computer, which can confirm that the ID token identifier is known and is considered to be trustworthy. In accordance with embodiments a use of an ID token identifier by means of the terminal and by means of the ID token may consist of the terminal reading out the ID token identifier from the ID token or otherwise receiving the ID token identifier and forwarding this to the ID provider computer, such that this can authenticate itself to the ID token.

The method may be advantageous since, by means of the determination step, the zero-knowledge authentication protocol, which is often costly from a time and process viewpoint, can be avoided with availability of a contact-based interface. The method can thus be significantly accelerated, without reducing security, since a contact-based interface can be considered to be sufficiently trustworthy.

In a further advantageous aspect the generation and the exchange respectively by the prior storage, on both sides, of an ID token identifier may be advantageous because an ID token identifier is thus provided independently of the implementation of the zero-knowledge authentication protocol. For the case in which the contact-based interface is used for terminal authentication to the ID token, existing interfaces of conventional ID tokens, which actually provide a use of an ID token identifier generated during the course of the zero-knowledge authentication protocol for subsequent authentication of an ID provider computer to the ID token, can thus also be used. The development or use of new ID tokens with corresponding interfaces, said ID tokens being specially adapted to a contact-based terminal authentication, can thus be omitted.

In a further advantageous aspect interfaces and protocols that are implemented by the ID provider computer in order for said computer to authenticate itself to the ID token can also be retained and used independently of whether the terminal has now authenticated itself to the ID token by means of a contactless or contact-based interface.

In a further advantageous aspect the method may allow the attributes stored in the ID token to be provided without media interruptions and in a legally compliant manner, for example for e-commerce and e-government applications. This is made possible in particular on account of the trust anchor formed by the authentication of the user and of the ID provider computer to the ID token. It is also particularly advantageous that there is no need for a central storage of the attributes of different users, such that the data protection problems existing in the prior art are solved as a result. With regard to the convenience of use of the method, it is particularly advantageous that a prior registration of the user is not necessary in order to use the ID provider computer.

The determination of whether a contact-based interface is present and ready for use is preferably performed fully automatically by the terminal, for example by sending a challenge to the ID token via a contact-based interface of the terminal. In the absence of a response it is determined that the ID token does not have a contact-based interface that is ready for use for the data exchange.

In accordance with embodiments, in the case of the use of the contact-based interface, the static secret, which for example has been input manually by the user via a keyboard of the terminal, is transferred in unencrypted form from the terminal to the ID token for the purpose of user authentication. A contact-based interface can be considered to be sufficiently trustworthy, such that the method can be further accelerated by the omission of an encryption.

In accordance with embodiments the implementation of the zero-knowledge authentication protocol comprises the steps of:
first implementation of a Diffie-Hellman key exchange with use of the static secret by means of the ID token and by means of the terminal for generation of a first shared temporary base point;
second implementation of a Diffie-Hellman key exchange with use of the first shared temporary base point, wherein the second implementation comprises the generation of the first public cryptographic key and a second public cryptographic key with the inclusion of the static secret and the exchange of the first and second public cryptographic keys between terminal and ID token;
establishment of a secure first data transfer channel between ID token and terminal with use of the first and second public cryptographic key;
derivation of an authentication key from the first public cryptographic key by means of the terminal; and use of the authentication key by means of the terminal to authenticate the user to the ID token via the first protected connection.

In accordance with embodiments the first and second public cryptographic keys are session-bound keys. This means that the keys, at the start of a session, for example when a user initiates his/her authentication to the ID token, are generated as described above and after completion of the session, for example following successful readout of the at least one attribute, are deleted again. This may further increase the security of the method.

In accordance with embodiments the execution of the zero-knowledge authentication protocol comprises:

transfer of domain parameters, which define an elliptic curve, from the ID token to the terminal, wherein the domain parameters contain a static base point of the elliptic curve;

generation of a random value by the ID token;

encryption of the random value with the aid of the static secret stored in the ID token with generation of an encrypted random value;

transfer of the encrypted random value from the ID token to the terminal;

use of the static secret input by the user via the terminal to decrypt the encrypted random value for reconstruction of the random value by means of the terminal;

The implementation of the zero-knowledge authentication protocol also comprises:

generation of a first private token key by means of the ID token;

derivation of a first public token key from the first private token key and the base point by means of the ID token, wherein the first private and the first public token keys form an asymmetric cryptographic key pair;

transfer of the first public token key from the ID token to the terminal during the course of the first Diffie-Hellman key exchange;

generation of a first private terminal key by means of the terminal;

derivation of a first public terminal key from the first private terminal key and the static base point by means of the terminal, wherein the first private terminal key and the first public terminal key form an asymmetric cryptographic key pair;

transfer of the first public terminal key from the terminal to the ID token during the course of the first Diffie-Hellman key exchange;

computation of a blinding point from the first private terminal key and the first public token key by means of the terminal; and computation of the first shared temporary base point from the random value, the static base point and the blinding point by means of the terminal;

computation of the blinding point from the first private token key and the first public terminal key by means of the ID token;

computation of the first shared temporary base point from the random value, the static base point and the blinding point by means of the ID token.

The implementation of the zero-knowledge authentication protocol also comprises:

generation of a second private terminal key by means of the terminal;

derivation of a second public terminal key from the second private terminal key and from the first shared temporary base point by means of the terminal, wherein the second private terminal key and the second public terminal key together form an asymmetric cryptographic key pair;

transfer of the second public terminal key from the terminal to the ID token during the course of the second Diffie-Hellman key exchange;

generation of a second private token key by means of the ID token;

derivation of a second public token key from the second private token key and the first shared temporary base point by means of the ID token, wherein the second public token key and the second private token key together form an asymmetric cryptographic key pair;

transfer of the second public token key from the ID token to the terminal, wherein the second public token key serves as the first public key, which is used as ID token identifier.

The implementation of the zero-knowledge authentication also comprises:

computation of a session key from the second public token key and the second public terminal key, in each case by means of the terminal and the ID token;

computation of the authentication key from the session key by means of each of the terminal and the ID token;

use of the session key by means of each of the terminal and the ID token in order to establish the first protected connection; and use of the authentication key to authenticate the terminal to the ID token. For example, an authentication value can be derived from the authentication key and transferred from the terminal to the ID token and compared there with an authentication value computed by the ID token. Alternatively, the authentication key can be transferred and compared with the authentication key calculated by the ID token as reference.

In accordance with embodiments the ID provider computer is authenticated to the ID token with the aid of a certificate of the ID provider computer. The certificate contains a specification of those attributes stored in the ID token for which the ID provider computer is authorised for read access. The ID token checks, on the basis of this certificate, whether the ID provider computer has the necessary read permission for the read access to a certain attribute before such a read access can be carried out.

In accordance with embodiments the authentication of the ID provider computer to the ID token comprises:

sending of a certificate of the ID provider computer, which certificate contains a static public key of the ID provider computer, from the ID provider computer via the terminal to the ID token;

verification of the certificate by means of the ID token; this can be performed for example by means of a certificate chain check;

generation of a test value, preferably a random value, by means of the ID token;

sending of the test value from the ID token to the ID provider computer via the terminal;

generation of an intermediate value, which is derived at least from the test value and from the ID token identifier, by means of the ID provider computer;

signing of the intermediate value with a static private cryptographic key of the ID provider computer in order to generate a signed value, wherein the static private key together with the static public key of the certificate forms an asymmetric cryptographic key pair;

transmission of the signed value from the ID provider computer via the terminal to the ID token;

signature checking of the signed value by means of the ID token with the aid of the static public key of the certificate.

In accordance with embodiments the method also comprises:

computation of a compressed value from the ID token identifier by means of the ID provider computer; and concatenation of the compressed value with the test value and the ID token identifier in order to generate the intermediate value.

The signature check may also comprise a computation by means of the ID token of the compressed value from the ID token identifier and a computation by means of the ID token of the intermediate value. The checking of the signature comprises a check as to whether the compressed value or intermediate value computed by the ID token is identical to the signed intermediate value of the ID provider computer. This can increase the security further, since the compression function of ID token and ID provider computer must also match.

In accordance with the embodiments a secure connection is established between the ID provider computer and the ID token via the terminal following successful authentication of the ID provider computer to the ID token, wherein the protected connection is based on an end-to-end encryption (and referred to hereinafter as "end-to-end connection"), and wherein the at least one attribute is read out from the ID token via the protected connection and is transferred to the ID provider computer. In accordance with other embodiments a mutual authentication of the ID provider computer and of the ID token may be necessary in order to establish the end-to-end connection. For example, the ID token may thus authenticate itself to the ID provider computer systems in that the ID token, for example during the course of its personalisation, stores a private key, referred to here as a private CA key, and public key, referred to here as a public CA key, in a memory of the ID token. Private and public CA keys form an asymmetric key pair (CA key pair). The CA key pair is provided by a certification body that acknowledges the operator of the ID provider computer as being trustworthy, wherein the public CA key is part of a certificate issued by the certification body. The ID token generates, with the private CA key, a signature of a data value, and the ID provider computer accesses the public CA key of the ID token in order to verify said signature with this. The public CA key can be checked for its origin and authenticity on the basis of the certificate. With successful signature check, the ID token has thus authenticated itself to the ID provider computer.

In accordance with further embodiments an end-to-end connection is first established between the ID token and the ID provider computer system, and the mutual authentication of the ID provider computer and of the ID token is performed via the end-to-end connection.

In accordance with embodiments the ID token is a security element (SE), which is integrated in a mobile telecommunication device. The method steps executed by the terminal are implemented by an application program executed on a processor of the mobile communication device.

In accordance with embodiments the static secret is a PIN, a CAN, password or a biometric feature of the user.

In accordance with embodiments the ID token is an integral part of a document. The document has an integrated PIN pad and a chip, which serves as terminal.

The ID token may also be an integral part of a mobile communication device, which has an integrated keyboard, wherein an application executed on the processor of the mobile communication device, which application is interoperable with the ID token, serves as terminal. The ID token can be formed as a security element.

The method may also comprise:

receipt of the static secret by the ID token; here, the static secret can be received as a value input manually by the user via the keyboard or via the PIN pad; the input value can be transferred to the ID token for example via a non-cryptographically protected data transfer connection on the basis of the contact-based interface between the terminal used for input (for example mobile communication device, document chip) with user interface and the ID token; the input secret is preferably transferred to the ID token in plain text and unencrypted, which can accelerate the method;

comparison of the manually input static secret by the ID token with a reference value of the static secret stored in the ID token for authentication of the user.

In accordance with an alternative embodiment the ID token is also formed as an integral part of a document. The document likewise has an integrated PIN pad and a chip serving as terminal with integrated memory. However, the static secret is not input here manually, but is already stored in the memory of the chip.

In accordance with a further alternative embodiment the ID token is an integral part of a mobile communication device. The mobile communication device includes an integrated keyboard and an integrated memory in which the static secret is stored. An application executed on the processor of the mobile communication device, which application is interoperable with the ID token, serves as terminal.

In embodiments in which the static secret is already stored in a memory of the terminal when the determination step is implemented, the method may also comprise:

display of the static secret stored in the integrated memory and/or a confirmation request via a display device;

receipt of a confirmation signal of the user by the terminal that the stored static secret is to be transferred from the terminal to the ID token;

in the case of the receipt of the confirmation signal, implementation of the transfer of the static secret via the contact-based interface to the ID token.

This can further accelerate the overall method, since the user now no longer has to input a password, which potentially is complex, but only has to confirm the transmission thereof to the ID token.

In a further aspect of the invention relates to a terminal. The terminal is operatively coupled to a data memory and has means, for example a keyboard or a PIN pad, for receiving a static secret input manually by a user of an ID token. Additionally or alternatively, the terminal has means for reading the secret from the data memory. The terminal also has a contactless and a contact-based interface for data exchange with an ID token. This means that the data memory is part of the terminal or is connected thereto via a network, and that the terminal can access the data of this data memory, at least in a reading manner. The terminal additionally has means for determining whether a contact-based interface of the ID token is present and can be used for data exchange with the terminal, and means for authenticating user to the ID token, for example a man/machine interface for inputting passwords, biometric data, etc.

The terminal is configured, in the event of determination of the fact that the ID token does not have the contact-based interface or that this cannot be used, to carry out the following steps:

implementation of a zero-knowledge authentication protocol via a contactless interface of the terminal and ID token in order to prove to the ID token that the terminal is in possession of the static secret, without transmitting this static secret to the ID token; the static secret is a secret shared between the user and the ID token; the implementation of the zero-knowledge authentication protocol comprises a generation of a first public cryptographic key by means of the ID token and the authentication of the user to the ID token via the contactless interface; and derivation of an ID token identifier by means of the terminal from the first public cryptographic key.

Should the terminal determine that the ID token has the contact-based interface and that this can be used, the terminal carries out the following steps:

authentication of the user to the ID token by transfer of the input or read static secret from the terminal to the ID token via the contact-based interface; the static secret is preferably transferred unencrypted in plain text; and access to an ID token identifier by means of the terminal.

The access to the ID token identifier comprises one of the following alternatives:

reading a data value, which was already stored on a memory of the terminal prior to the determination, from this memory, wherein the data value is also stored on a memory of the ID token prior to the determination, and use of the data value as the ID token identifier by means of the terminal and by means of the ID token; or in response to the determination, generation of a data value by means of the terminal, transmission of the data value from the terminal to the ID token, and use of the generated data value as the ID token identifier by means of the terminal and by means of the ID token; or receipt of a data value from the ID token by means of the terminal and use of the generated data value as the ID token identifier by means of the terminal and by means of the ID token.

The terminal is also configured to send the ID token identifier to an ID provider computer. This can be performed for example via a network, for example a mobile communication network.

In a further aspect of the invention relates to a memory medium, which can be operatively coupled to a terminal, with computer-interpretable instructions, wherein an execution of the instructions by means of a processor results in an execution of the following method:

receipt of a static secret input manually by a user of an ID token, or reading of the static secret from a memory medium operatively coupled to the terminal; and determination of whether a contact-based interface of the ID token is present and can be used for data exchange with a terminal.

If the terminal determines that the ID token does not have the contact-based interface or that this cannot be used, the terminal executes a zero-knowledge authentication protocol via a contactless interface of the terminal and ID token in order to prove to the ID token that the terminal is in possession of the input or read static secret. Here, the secret is not transmitted to the ID token. The static secret is a secret shared between the user and the ID token. The implementation of the zero-knowledge authentication protocol comprises a generation of a first public cryptographic key by means of the ID token and the authentication of the user to the ID token via the contactless interface. In the case of this determination, the terminal additionally derives an ID token identifier from the first public cryptographic key.

If the terminal determines that the ID token has the contact-based interface and that this can be used, the terminal carries out the following steps:

authentication of the user to the ID token by transfer of the input or read static secret to the ID token via the contact-based interface; and access to an ID token identifier by the terminal.

The access comprises one of the following alternatives:

reading of a data value, which was already stored on a memory of the terminal prior to the determination, from this memory, wherein the data value is also stored on a memory of the ID token prior to the determination, and use of the data value as the ID token identifier by means of the terminal and by means of the ID token; or in response to the determination, generation of a data value by means of the terminal, transmission of the data value from the terminal to the ID token, and use of the generated data value as the ID token identifier by means of the terminal and by means of the ID token; or receipt of a data value from the ID token by means of the terminal, and use of the generated data value as the ID token identifier by means of the terminal and by means of the ID token.

The terminal then sends the ID token identifier to an ID provider computer. With the ID token identifier the ID provider computer is able to identify itself to the ID token as authorised to read out the one or more attributes stored in the ID token. The connection between the ID token and the ID provider computer can be established via a network, in particular the Internet.

Embodiments of the invention are thus particularly advantageous since the at least one attribute is read out from a particularly trustworthy document, for example an official document. It is also of particular advantage that a central storage of the attributes is not necessary. The invention thus enables a particularly high measure of trustworthiness with regard to the communication of the attributes belonging to a digital identity, combined with optimal data protection with extremely convenient handling.

In accordance with an embodiment of the invention the ID provider computer sends the at least one attribute read out from the ID token directly to a further computer. The further computer system for example may be a server for providing an online service or another service, such as a banking service or for ordering a product. By way of example, the user may open an account online, for which purpose attributes containing the identity of the user are transferred from the ID token computer to the further computer of a bank.

In accordance with an embodiment of the invention the ID provider computer receives an attribute specification from the further computer or a user computer. The user computer may be the terminal or another data-processing system, with which the user is currently using an online service, provided by the further computer, as client. The attribute specification can be transferred together with an identifier of the further computer to the ID provider computer from the user computer or the further computer. With the aid of the identifier the ID provider computer identifies the further computer wishing to use the identification services in order to bill this by means of the read-out attributes containing the identity of the user.

Figure 4:
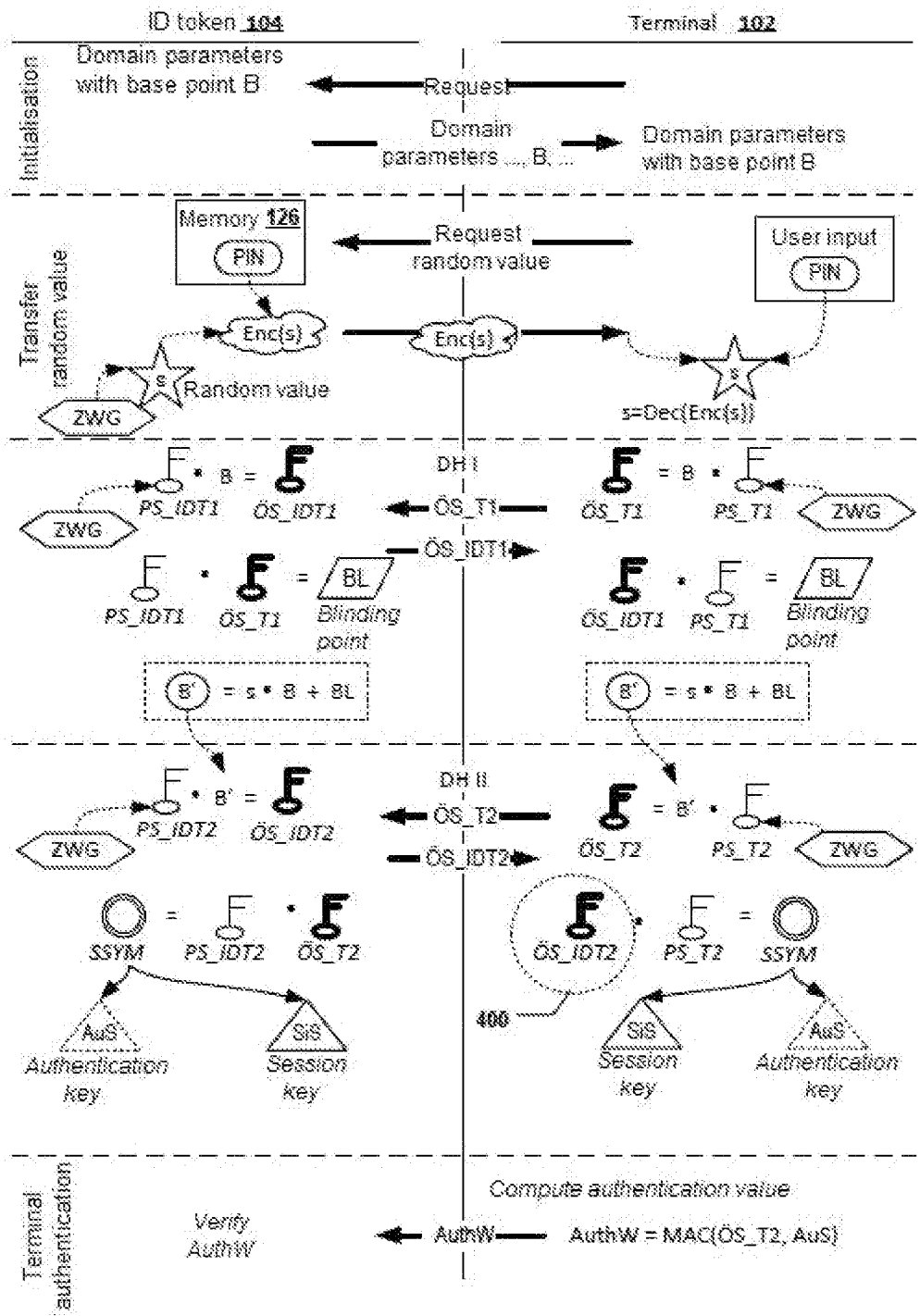
Figure 5:
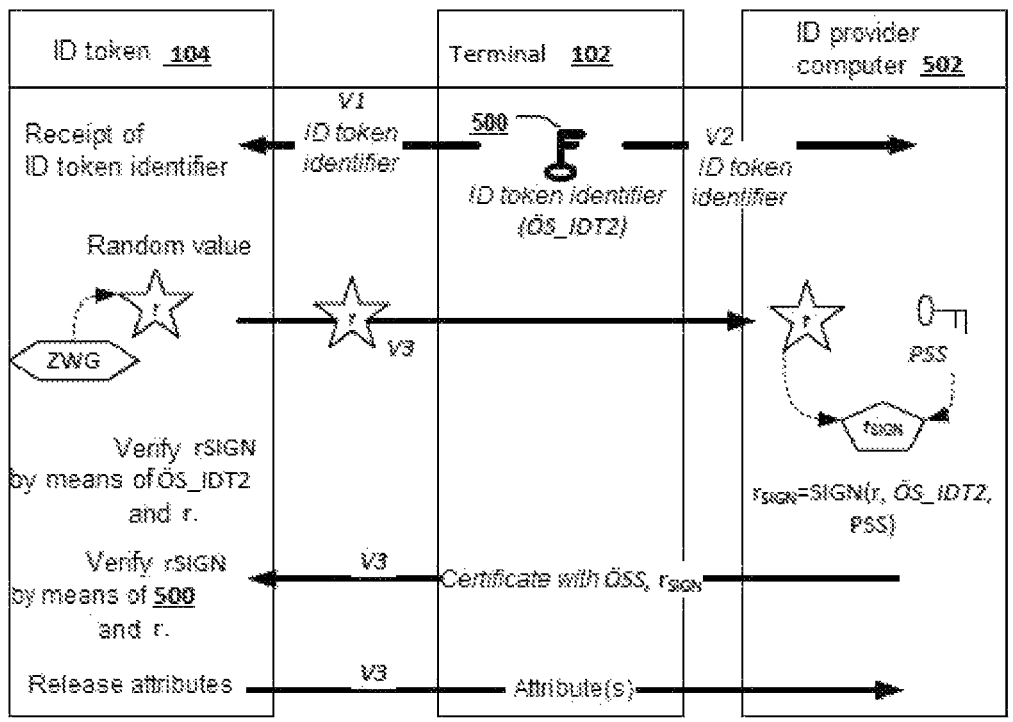
Figure 6:
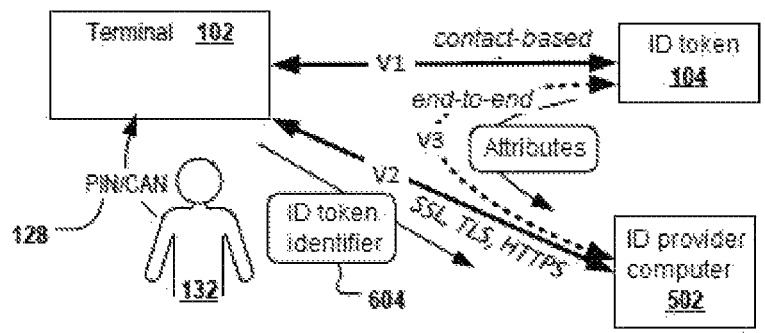

Embodiments of the invention will be explained in greater detail hereinafter with reference to the drawings, in which:

FIG. 1 shows a block diagram of an embodiment of a terminal according to the invention with ID token, FIG. 2 shows block diagrams of various embodiments of a terminal according to the invention, each with an ID token, FIG. 3 shows a flow diagram of an embodiment of a method according to the invention, FIG. 4 shows a flow diagram of a zero-knowledge authentication protocol for authenticating a terminal and a user to an ID token, FIG. 5 shows a flow diagram of the authentication of the ID provider computer to the ID token, and FIG. 6 shows a block diagram of a system comprising an ID token, a terminal and an ID provider computer.

Elements of the subsequent embodiments that correspond to one another will be designated by the same reference signs.

FIG. 1 shows a system 100 with a terminal 102 and an ID token 104. The ID token 104 has a processor 122 and a random access memory 124. The ID token also has a non-volatile memory medium 126, on which one or more attributes 130 and also at least one secret in the form of a PIN 128 are stored in a protected manner. The ID token 104 also has a contactless NFC interface 136 and a contact-based interface 120 so as to be able to exchange data with the terminal. The terminal may have a reader 106, which has a contact-based interface 118 corresponding to the interface 120 and an NFC interface 134 corresponding to the interface 136.

The terminal has a processor 110, a random access memory 112, and a non-volatile memory medium 114, on which instructions for implementing a zero-knowledge authentication protocol in interaction with the ID token 104 are stored. The terminal additionally has a user interface 116, which allows the user 132 to input a PIN or a password 128 or which is configured to sense biometric data of the user.

FIG. 2a shows an ID token 202 which has merely a contact-based interface 120, but not a contactless interface. The terminal 250 has both a contact-based and a contactless interface and, following a determination that the ID token has a contact-based interface ready for use, selectively uses the contact-based interface 118 in order to exchange data with the ID token.

FIG. 2b shows a document 214, for example a security document such as an electronic identity card, comprising an ID token 206 and a chip 260 functioning as terminal as integral parts. The ID token 206 can be formed for example as a security element. The chip may contain a non-volatile protected memory 114, on which a secret (PIN, biometric data, etc.) of the user 132 can be stored. The document 214 additionally has a man/machine interface 262 and a display 268. The secret 128 stored on the memory 114 can be displayed to the user 132 via the display 268, after calling up a logic executed on the chip 260. The display can be provided together with a query as to whether the terminal is to be authenticated to the ID token 206, for example in order to read out and release certain attributes stored in the ID token 206 by means of an ID provider computer. The user must then only confirm the query via the man/machine interface 262—he/she no longer has to explicitly input the PIN or the secret 128. The interface 262 can be formed as a pressure sensor, integrated keyboard field, PIN pad or the like, and the confirmation action of the user may be, accordingly, a pressing of the pressure sensor or the actuation of a keypad.

FIG. 2c shows a mobile telephone 208, which has an ID token 210 in the form of a security element, a chip 270, and also a keyboard 272 and a display 268. The chip contains a contactless interface 134 and a contact-based interface 118 for data exchange with the ID token 210. Since the ID token 210 has just a contact-based interface, however, only the interface 118 is also used for data exchange following a corresponding determination by the chip. The non-volatile, protected memory 114 of the chip 270 may have stored the secret 128, and land may request the user merely to confirm via the display 268 that the terminal is to be authenticated to the ID token on the basis of a zero-knowledge authentication protocol on the basis of the secret. Alternatively, the user can also input the secret via the keyboard 272 in order to enable the implementation of the zero-knowledge authentication protocol between the chip 270 and ID token 210.

FIG. 3 shows a flow diagram of an embodiment of a method as can be carried out by way of example by a terminal 102 together with an ID token 104 as illustrated in FIG. 1. In the step 302 the terminal 102 determines whether a contact-based interface of the ID token is present and can be used for data exchange with the terminal. An interface could indeed be physically present, however the ID token may be in an operating mode which exclusively provides communication via the contactless interface. In this case it would therefore also be necessary for the ID token 104 to be in an operating mode for contact-based data exchange with the terminal. If the ID token has a contact-based interface, which in addition is ready for use, the user authenticates themself in step 304 to the ID token by transfer of the unencrypted static secret, for example a PIN, from the terminal 102 to the ID token 104 via the contact-based interface 118, 120. The terminal additionally accesses an ID token identifier. The ID token identifier is a value that is also known to the ID token 104, for example in that this value is stored in a protected manner in the memory medium 126.

If the ID token does not have a contact-based interface 120 or if this is not ready for use, the terminal 102 in step 308 implements a zero-knowledge authentication protocol. This serves to prove to the ID token that the terminal is in possession of a static secret, for example in the form of a PIN, and additionally serves for authentication of the user to the ID token via the contactless interface. The terminal 102 in step 310 then derives an ID token identifier from a cryptographic key used in the zero-knowledge authentication protocol, preferably the second public token key ÖS_IDT2.

In step 312 the terminal sends the ID token identifier to an ID provider computer. The ID provider computer uses the ID token identifier in step 314 to authenticate itself to the ID token. Following successful authentication of the user and the ID provider computer to the ID token, the ID provider computer reads out one or more attributes 130 stored in a protected manner in the memory 126 in order to sign this/these and forward it/them to a further computer, for example a computer system of an online service.

FIG. 4 shows a flow diagram of a zero-knowledge authentication protocol that is executed via contactless interfaces 134, 136 of the terminal 102 and ID token 104.

Following the determination 302 that there is no contact-based interface ready for use available, the terminal sends a request to receive domain parameters to the ID token. One or more domain parameters are stored in the ID token, in each case with an associated base point B. A set of domain parameters with a corresponding base point B is sent from the ID token to the terminal in response to the request. The domain parameters define an elliptic curve, on which a subsequently executed Diffie-Hellman key exchange is based.

The terminal sends a request to obtain a random value to the ID token. A random value generator ZWG then generates a random number s, which is encrypted with the PIN stored in the protected memory 126 and is sent in encrypted form to the terminal. The terminal receives the PIN via a user input and uses the PIN to decrypt the received value Enc(s). Following the decryption, the random value s is thus known both to the ID token and to the terminal. Both the ID token and the terminal are in possession of a common secret s, without having had to transfer the PIN for this purpose.

For the purpose of a first Diffie-Hellman key exchange DH I, a random value generator ZWG of the ID token generates a random value PS_IDT1, which is used as a first private token key. The first private token key is multiplied by the base point B in order to obtain a first public token key ÖS_IDT1. Similarly, a terminal-side random value generator ZWG generates a random value PS_T1, which is used as first private terminal key. The first private terminal key is multiplied by the base point B in order to obtain a first public terminal key ÖS_T1. The two public keys ÖS_IDT1 and ÖS_T1 are exchanged ("first Diffie-Hellman key exchange"). In the next step the ID token multiplies the first private token key by the first public terminal key in order to obtain a blinding point BL. Similarly, the terminal multiplies the first private terminal key by the first public token key in order to likewise obtain the blinding point BL. Lastly, a temporary value B' (also referred to as a common temporary base point) valid only for one session is computed from the blinding point, the random value s and the base point B, in each case both by means of the ID token and by means of the terminal.

For the purpose of a second Diffie-Hellman key exchange DH II the random value generator ZWG of the ID token generates a random value PS_IDT2, which is in use as a second private token key. The second private token key is multiplied by the temporary value B' in order to obtain a second public token key ÖS_IDT2. Similarly, the terminal-side random value generator ZWG generates a random value PS_T2, which is used as a second private terminal key. The second private terminal key is multiplied by the temporary value B' in order to obtain a second public terminal key ÖS_T2. The two public keys ÖS_IDT2 and ÖS_T2 are exchanged.

Lastly, a symmetric key SSYM is calculated both by the ID token and by the terminal. For this purpose the ID token multiplies the second private token key with the second public terminal key. The terminal for this purpose multiplies the second private terminal key by the second public token key. The symmetric key SSYM can itself serve as session key SIS for cryptographic protection of the subsequent data communication between ID token and terminal or can be used to derive such a session key SIS both on the part of the ID token and on the part of the terminal. In addition, an authentication key AuS can be derived from the session key SSYM. By applying a MAC function to the authentication key and the second public terminal key, an authentication value AuthW can be calculated by the terminal. The authentication value is transferred from the terminal to the ID token so that this value can be verified by the terminal. The authentication value thus serves to authenticate the terminal to the ID token.

The ID token can in turn derive an authentication key and the authentication value and transmit the authentication value to the terminal in order to authenticate itself to the terminal (two-way authentication). However, the optional steps for the authentication of the ID token to the terminal are not illustrated in FIG. 4.

The information necessary for the terminal in order to calculate the temporary value B' is thus provided by the ID token. However, the terminal can only use this when it is in possession of a valid PIN. The PIN for this purpose must be input by the user. The PIN may also be formed as a CAN (card access number), wherein the CAN is input into the terminal in that the user positions the ID token with the CAN in such a way in front of the terminal that the CAN can be captured y an optical sensor of the terminal.

FIG. 5 shows steps that serve for authentication of an ID provider computer 102 to the ID token 104. First, it must be ensured that both the terminal and the ID token have a common data value (ID token identifier 500). If the ID token and the terminal have already implemented a zero-knowledge authentication protocol, the second public token key ÖS_IDT2 can preferably function as ID token identifier, since this is already present on both sides. Further data exchange steps between ID token and terminal for exchange of the ID token identifier are not necessary in this case. If, as illustrated in FIG. 5, the ID token identifier is not yet present on both sides, the identifier may have to be generated by one side and transferred to the other side via a first connection V1 between terminal and ID token. The terminal must additionally transfer the ID token identifier to the ID provider computer.

A random value generator ZWG of the ID token generates a random value r and transfers this via a connection V3 to the ID provider computer 502. The ID provider computer signs the random value and the ID token identifier, or an intermediate value derived from the random value and the ID token identifier, using a private static cryptographic key PSS of the ID provider computer. The derived value for example may be a concatenation product from the random value and the ID token identifier. The static private key of the ID provider computer forms an asymmetric cryptographic key pair together with a static public cryptographic key ÖSS.

The result of this signing is designated as $r_{SIGN}$. The result $r_{SIGN}$ is transferred from the ID provider computer 502 to the ID token via the connection V3. The connection V3 is preferably formed as a protected data communication channel, which is based on an end-to-end encryption, as illustrated for example in FIG. 6.

The ID token is in possession of the static key ÖSS. The static key ÖSS can be made available online for example, or can be transferred as part of a certificate together with the result $r_{SIGN}$ from the ID provider computer to the ID token.

The ID token verifies the received data value $r_{SIGN}$ by means of its copy of the ID token identifier, the random value r and the static public key ÖSS and thus verifies the authorisation of the ID provider computer to read out attributes from the protected memory of the ID token. The verification for example may consist in generating a derived value from the random value and the ID token identifier, for example a concatenation product from the random value and the ID token identifier, and checking whether the received signed derived value is identical to the value derived by the ID token. In the case of a successful authentication of the ID provider computer, one or more attributes are transferred to the ID provider computer.

In addition (not illustrated here) the terminal may compute a compressed value from the ID token identifier, for example a hash value. The compressed value may be transferred from the terminal to the ID token in addition to or instead of the ID token identifier. The compressed value can be used for generation of the derived value, for example in that it is additionally included in the concatenation product. In this case the ID token must have the same compression function and check, during the course of the verification of the ID token identifier, whether a compressed value computed by the ID token from the ID token identifier corresponds to the compressed value received by the ID token from the terminal. Instead of by the terminal, the compression can also be performed by the ID provider computer.

FIG. 6 shows a system with a terminal 102, which is connected to an ID token 104 via a first connection V1. The connection V1 may be a contactless or a contact-based connection. The connection V2 between the terminal 102 and an ID provider computer 102 is preferably a protected connection, for example a SSL, TLS or HTTPS connection. The connection V2 can be established via a network, for example the Internet. Following successful authentication of the user and of the ID provider computer to the ID token by means of protocol implementation, a third connection V3 is preferably established as an end-to-end-encrypted connection between the ID token and ID provider computer and is based physically on the first and the second connection.

The invention claimed is:

1. A method for reading at least one attribute stored in an ID token, wherein the ID token is assigned to a user, said method comprising:
   determining, by a terminal, whether a contact-based interface of the ID token is available for data exchange with the terminal;
   if the ID token does not have the contact-based interface available providing data exchange with the terminal, the following are carried out:
   implementing a zero-knowledge authentication protocol via a contactless interface of the terminal and a contactless interface of the ID token in order to prove to the ID token that the terminal is in possession of a static secret, without transmitting this static secret to the ID token, wherein the static secret is a secret shared between the user and the ID token, wherein the implementing comprises generation of a first public cryptographic key (OS_IDT2) separately by the ID token and the terminal based on a random number generated by the ID token and transmitted to the terminal in an encrypted format, wherein the random number is encrypted using the static secret, and wherein the implementing the zero-knowledge authentication protocol comprises the authentication of the user to the ID token via the contactless interface based on the generated first public cryptographic key (OS_IDT2); and
   deriving of an ID token identifier by the terminal from the first public cryptographic key (OS_IDT2);
   if the ID token has the contact-based interface capable of data exchange with the terminal:
   authenticating the user to the ID token by transmission of the static secret from the terminal to the ID token via the contact-based interface;
   accessing an ID token identifier by the terminal, wherein the accessing comprises:
   reading of a data value, which was already stored on the memory of the terminal prior to the determination, from this memory, wherein the data value is also stored on a memory of the ID token prior to the determination, and using the data value as the ID token identifier by the terminal and by the ID token; or
   in response to the determination, generating a data value by the terminal, transmitting the data value from the terminal to the ID token, and using the generated data value as the ID token identifier by the terminal and by the ID token; or
   generating a data value by the ID token, transmitting the data value from the ID token to the terminal, and using the generated data value as the ID token identifier by the terminal and by the ID token;
   sending of the ID token identifier from the terminal to an ID provider computer;
   authenticating, the ID provider computer to the ID token using the ID token identifier;
   following successful authentication of the user and the ID provider computer to the ID token:
   providing read access to the ID provider computer to the at least one attribute stored in the ID token;
   the ID provider computer signing the at least one attribute; and
   transferring the signed at least one attribute to a further computer.

2. The method according to claim 1, wherein the implementing the zero-knowledge authentication protocol comprises:
   implementing a first Diffie-Hellman key exchange (DH I) with use of the static secret by the ID token and by the terminal for generation of a first shared temporary base point (B');
   implementing a second Diffie-Hellman key exchange (DH II) with use of the first shared temporary base point (B'), wherein the second Diffie-Hellman key exchange comprises generation of the first public cryptographic key (ÖS_IDT2) and a second public cryptographic key (ÖS_T2) and an exchange of the first and second public cryptographic keys between the terminal and the ID token;
   establishing a secure first data transfer channel (V1) between ID token and terminal with use of the first and second public cryptographic key;
   deriving an authentication key (AuS) from the first public cryptographic key (ÖS_IDT2) by the terminal; and
   using the authentication key by the terminal to authenticate the user to the ID token via the first protected connection.

3. The method according to claim 2, wherein the first and second public cryptographic key are session-bound keys.

4. The method according to claim 2, wherein the implementing the zero-knowledge authentication protocol comprises:
   transferring domain parameters (B), which define an elliptic curve, from the ID token to the terminal, wherein the domain parameters contain a static base point (B) of the elliptic curve;
   generating a random value (s) by the ID token;
   encrypting the random value (s) with the aid of the static secret (PIN) stored in the ID token to generate an encrypted random value (Enc(s));
   transferring the encrypted random value (Enc(s)) from the ID token to the terminal;
   using the static secret (PIN) input by the user via the terminal to decrypt the encrypted random value (Enc(s)) for reconstruction of the random value by the terminal;
   generating a first private token key (PS_IDT1) by the ID token;
   deriving a first public token key (OS_IDT1) from the first private token key (PS_IDT1) and the base point by the ID token, wherein the first private and the first public token key form an asymmetric cryptographic key pair;
   transferring the first public token key (OS_IDT1) from the ID token to the terminal during the course of the first Diffie-Hellman key exchange;
   generating a first private terminal key (PS_T1) by the terminal;
   deriving a first public terminal key (OS_T1) from the first private terminal key and the static base point (B) by the terminal, wherein the first private terminal key (PS_T1) and the first public terminal key (OS_T1) form an asymmetric cryptographic key pair;

transferring the first public terminal key from the terminal to the ID token during the course of the first Diffie-Hellman key exchange;

computing a blinding point (BL) from the first private terminal key and the first public token key by the terminal;

computing the first shared temporary base point (B') from the random value (s), the static base point (B) and the blinding point (BL) by the terminal;

computing the blinding point (BL) from the first private token key (PS_IDT1) and the first public terminal key (OS_T1) by the ID token;

computing the first shared temporary base point (B') from the random value (s), the static base point (B) and the blinding point (BL) by the ID token;

generating a second private terminal key (PST2) by the terminal;

deriving a second public terminal key (OS_T2) from the second private terminal key and from the first shared temporary base point (B') by the terminal, wherein the second private terminal key and the second public terminal key together form an asymmetric cryptographic key pair;

transferring the second public terminal key (OS_T2) from the terminal to the ID token during the course of the second Diffie-Hellman key exchange (DH II);

generating a second private token key (PS_IDT2) by the ID token;

deriving a second public token key (OS_IDT2) from the second private token key (PS_IDT2) and the first shared temporary base point (B') by the ID token, wherein the second public token key and the second private token key together form an asymmetric cryptographic key pair;

transferring the second public token key (OS_IDT2) from the ID token to the terminal, wherein the second public token key (OS_IDT2) serves as the first public key, which is used as ID token identifier;

computing a session key (SSYM, SiS) from the second public token key and the second public terminal key by the ID token;

computing the session key (SSYM, SiS) from the second public token key and the second public terminal key by the terminal;

computing the authentication key (AuS) from the session key (SSYM) by the terminal;

computing the authentication key (AuS) from the session key (SSYM) by the ID token in the function of a reference value;

using the session key (SSYM, SiS) by each of the terminal and the ID token in order to establish the first protected connection; and using the authentication key (AuS) to authenticate the terminal to the ID token.

5. The method according to claim 1, wherein the ID provider computer is authenticated to the ID token with the aid of a certificate of the ID provider computer, wherein the certificate contains a specification of those attributes stored in the ID token for which the ID provider computer is authorized for read access.

6. The method according to claim 1, wherein the authentication of the ID provider computer to the ID token comprises:

sending of a certificate of the ID provider computer, which certificate contains a static public key (ÖSS) of the ID provider computer, from the ID provider computer via the terminal to the ID token;

verifying the certificate by the ID token;

generating a test value (r) by the ID token;

sending of the test value from the ID token to the ID provider computer via the terminal;

generating an intermediate value (rSIGN), which is derived at least from the test value and from the ID token identifier, by the ID provider computer;

signing of the intermediate value with a static private cryptographic key (PSS) of the ID provider computer in order to generate a signed value (rSIGN), wherein the static private key together with the static public key (ÖSS) of the certificate form an asymmetric cryptographic key pair;

transmitting the signed value (rSIGN) from the ID provider computer via the terminal to the ID token; and signature checking of the signed value by the ID token with the aid of the static public key (ÖSS) of the certificate.

7. The method according to claim 6, further comprising:

computing a compressed value from the ID token identifier by the ID provider computer; and concatenating the compressed value with the test value (r) and the ID token identifier in order to generate the intermediate value.

8. The method according to claim 1, further comprising:

establishing a protected connection (V3) between the ID provider computer and the ID token via the terminal following successful authentication of the ID provider computer to the ID token, wherein the protected connection is based on an end-to-end encryption, and wherein the at least one attribute is read out from the ID token via the protected connection and is transferred to the ID provider computer.

9. The method according to claim 1, wherein the ID token is a security element, which is integrated in a mobile telecommunication device, wherein the method executed by the terminal are executed by an application program, wherein the application program is executed on a processor of the mobile communication device.

10. The method according to claim 1, wherein the static secret is one of the following objects: a Personal Identification Number (PIN); a Card Access Number (CAN); a password; or a biometric feature of the user.

11. The method according to claim 1, wherein the ID token is an integral part of a document, wherein the document has an integrated PIN pad, wherein the document has a chip, wherein the chip serves as terminal; or wherein the ID token is an integral part of a mobile communication device, wherein the mobile communication device has an integrated keyboard, wherein an application executed on the processor of the mobile communication device, which application is interoperable with the ID token, serves as terminal;

further comprising:

receiving the static secret by the ID token as a value input manually by the user via the keyboard or via the PIN pad; and comparing the manually input static secret by the ID token with a reference value of the static secret stored in the ID token for authentication of the user.

12. The method according to claim 1,
wherein the ID token is an integral part of a document, wherein the document has an integrated PIN pad, wherein the document has a chip with integrated memory, in which the static secret is stored, wherein the chip serves as a terminal; or
wherein the ID token is an integral part of a mobile communication device, wherein the mobile communication device contains a processor, an integrated keyboard and an integrated memory, in which the static secret is stored, wherein an application executed on the processor of the mobile communication device, which application is interoperable with the ID token, serves as terminal;
further comprising:
  displaying the static secret stored in the integrated memory and/or a confirmation request via a display;
  receiving a confirmation signal of the user by the terminal that the stored static secret is to be transferred from the terminal to the ID token; and
  in the case of the receipt of the confirmation signal, implementing the transfer of the static secret via the contact-based interface.

13. A terminal comprising;
a data memory, which is operatively coupled to the terminal;
means for receiving a static secret input manually by a user of an ID token and/or means for reading the static secret from the data memory;
a contactless interface for data exchange with an ID token;
a contact-based interface for data exchange with the ID token;
means for determining whether a contact-based interface of the ID token is available for data exchange with the terminal; and
means for authenticating the user to the ID token;
wherein the terminal is configured, in the event of determination of the fact that the ID token does not have an available contact-based interface for data exchange with the terminal, to perform the following:
implementation of a zero-knowledge authentication protocol, via the contactless interface of the terminal and a contactless interface of the ID token, in order to prove to the ID token that the terminal is in possession of the static secret, without transmitting this static secret to the ID token, wherein the static secret is a secret shared between the user and the ID token, wherein the implementation comprises generation of a first public cryptographic key (OS_IDT2) separately by the ID token and the terminal based on a random number generated by the ID token and transmitted to the terminal in an encrypted format, wherein the random number is encrypted using the static secret, and wherein the implementation of the zero-knowledge authentication protocol comprises the authentication of the user to the ID token via the contactless interface based on the generated first public cryptographic key (OS_IDT2); and
derivation of an ID token identifier by the terminal from the first public cryptographic key (OS_IDT2);
wherein if the terminal determines that the ID token has an available contact-based interface for data exchange with the terminal:
authenticating the user to the ID token by transfer of the input or read static secret from the terminal to the ID token via the contact-based interface of the terminal and a contact-based interface of the ID token;
accessing an ID token identifier by the terminal, wherein the access comprises:
  reading a data value, which was already stored on a memory of the terminal prior to the determination, from the memory, wherein the data value is also stored on a memory of the ID token prior to the determination, and use of the data value as the ID token identifier by the terminal and by the ID token; or
  in response to the determination, generating a data value by the terminal, transmitting the data value from the terminal to the ID token, and use of the generated data value as the ID token identifier by the terminal and by the ID token; or
  receiving a data value from the ID token by the terminal and using the received data value as the ID token identifier by the terminal and by the ID token; and
sending of the ID token identifier from the terminal to an ID provider computer.

14. A non-transitory computer readable storage medium with computer-interpretable instructions, wherein the storage medium is operatively coupled to a terminal, and wherein an execution of the instructions by a processor results in an execution of the following method;
receiving a static secret input manually by a user of an ID token, or reading of the static secret from a memory medium operatively coupled to the terminal; and
determining whether a contact-based interface of the ID token is available for data exchange with a terminal;
if it is determined that the ID token does not have an available contact-based interface for data exchange with the terminal:
implementing a zero-knowledge authentication protocol via a contactless interface of the terminal and a contactless interface of the ID token in order to prove to the ID token that the terminal is in possession of the input or read static secret, without transmitting the static secret to the ID token, wherein the static secret is a secret shared between the user and the ID token, wherein the implementing comprises generation of a first public cryptographic key (OS_IDT2) separately by the ID token and the terminal based on a random number generated by the ID token and transmitted to the terminal in an encrypted format, wherein the random number is encrypted using the static secret, and wherein the implementing the zero-knowledge authentication protocol comprises the authentication of the user to the ID token via the contactless interface based on the generated first public cryptographic key (OS_IDT2); and
deriving, by the terminal, an ID token identifier from the first public cryptographic key (OS_IDT2);
if it is determined that the ID token has an available contact-based interface for data exchange with the terminal:
authenticating the user to the ID token by transfer of the input or read static secret to the ID token via the contact-based interface; and
access to an ID token identifier by the terminal, wherein the access comprises:
  reading a data value, which was already stored on a memory of the terminal prior to the determination, from this memory, wherein the data value is also stored on a memory of the ID token prior to the determination, and using the data value as the ID token identifier (IDPICC) by the terminal and by the ID token; or in response to the determination, generating a data value by the terminal, transmitting the data value from the terminal to the ID token, and using the generated data value as the ID token identifier (IDPICC) by the terminal and by the ID token; or receiving a data value from the ID token by the terminal, and using the received data value as the ID token identifier (IDPICC) by the terminal and by the ID token; and sending the ID token identifier from the terminal to an ID provider computer.

* * * * *